United States Patent [19]

Darnell

[11] 3,995,378

[45] * Dec. 7, 1976

[54] MATHEMATICS VISUAL TEACHING AID

[76] Inventor: Eula K. Darnell, 307 Baldwin, West Helena, Ark. 72390

[ * ] Notice: The portion of the term of this patent subsequent to Sept. 30, 1992, has been disclaimed.

[22] Filed: Sept. 26, 1975

[21] Appl. No.: 617,107

Related U.S. Application Data

[63] Continuation-in-part of Ser. No. 488,182, July 12, 1974, Pat. No. 3,908,287.

[52] U.S. Cl. .................................. 35/31 B; 35/77
[51] Int. Cl.[2] ........................................ G09B 19/02
[58] Field of Search ......... 35/30, 31 R, 31 B, 31 D, 35/31 F, 31 G, 32, 33, 69, 70, 71, 72, 73, 77; 40/135

[56] References Cited

UNITED STATES PATENTS

| | | | |
|---|---|---|---|
| 43,545 | 7/1864 | Bugbee | 35/73 |
| 1,349,776 | 8/1920 | Mackintosh | 35/73 |
| 1,826,034 | 10/1931 | Williamson | 35/73 |
| 2,207,585 | 7/1940 | Gasper | 40/135 |
| 2,369,804 | 2/1945 | Schoolfield et al. | 35/35 H |
| 2,866,278 | 12/1958 | Snarr | 35/31 F |
| 2,958,961 | 11/1960 | Wheeler | 35/73 |
| 3,129,518 | 4/1964 | Burris | 35/31 D |
| 3,521,383 | 7/1970 | Terwilleger | 35/31 D |
| 3,908,287 | 9/1975 | Darnell | 35/31 D |

*Primary Examiner*—William H. Grieb
*Attorney, Agent, or Firm*—Berman, Aisenberg & Platt

[57] ABSTRACT

A mathematics visual aid particularly useful in teaching subtraction to both slow and fast learners. The apparatus includes in a preferred embodiment form a support structure having a plurality of vertical divider members which define a plurality of working compartments or work areas. The compartments are arranged in columns, from right to left, which correspond to the increasing place-value components 1, 10, 100, 1,000 . . . etc. Affixed within each of the plurality of columns is a unique set of workpieces such that each column is associated with one place-value component. Each workpiece comprises a substantially cylindrical body having a shaft extending axially therethrough. Extending upwardly from a portion of the cylindrical surface of each workpiece are integrally formed information-bearing indicia which, within each column, identify that column's place-value. A pivot pin extends through the shaft of a plurality of adjacent column's workpieces such that the latter are made rotatable which permits selective exposure of the information-bearing indicia of each workpiece during the working of a problem. Each column of compartments consists preferably of two rows, one of which has rotatably mounted therein nine workpieces, the other of which has mounted therein ten workpieces. The apparatus is designed to visualize in a most elemental manner the concept of re-grouping a higher order place-value component into a lower order place-value component so as to facilitate the teaching process associated with subtraction.

14 Claims, 6 Drawing Figures

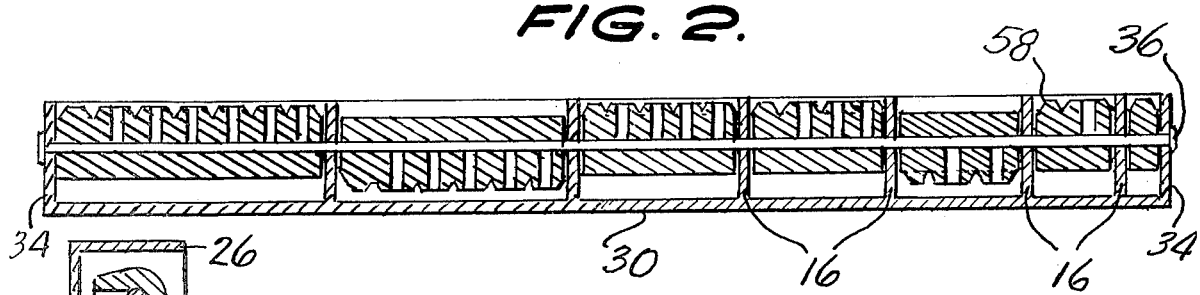
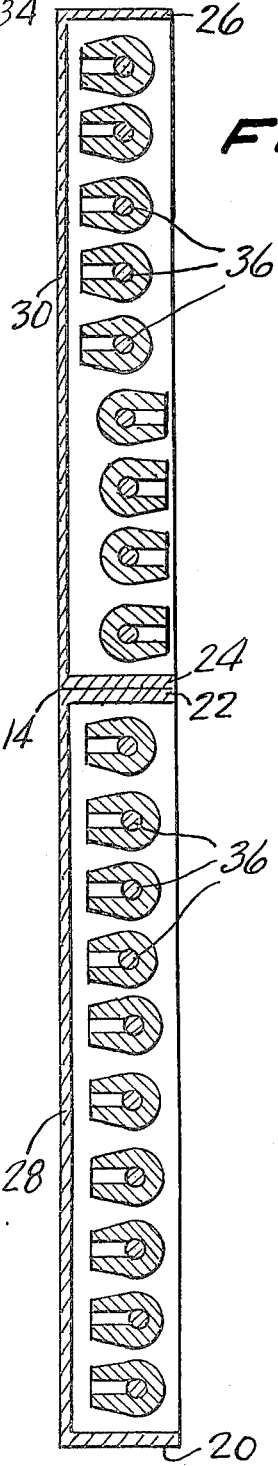
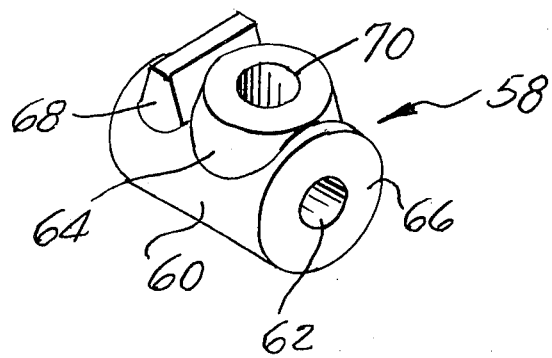
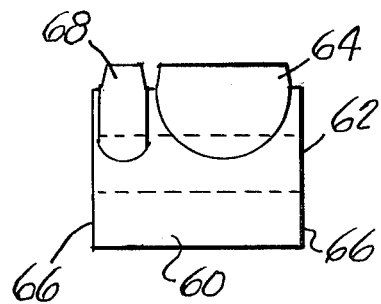
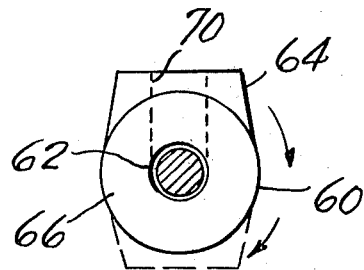

MATHEMATICS VISUAL TEACHING AID

CROSS REFERENCE TO RELATED APPLICATION

This application is a continuation-in-part of my U.S. application Ser. No. 488,182, filed July 12, 1974, now U.S. Pat. No. 3,908,287 issued Sept. 30, 1975.

BACKGROUND OF THE INVENTION

1. Field of the Invention

This invention relates generally to the art of mathematics instruction and, more particularly, is related to an apparatus and associated technique for visually conveying to students the processes involved in mathematics, particularly with respect to subtraction.

2. Description of the Prior Art

Various methods and apparatuses have been heretofore proposed for use as visual teaching aids in mathematics. Many of such devices have relied on the principles of the ancient abacus, a counting frame with rows of beads sliding on wires. Such devices have taken numerous forms in the past, but all have as a common objective the provision of a visual teaching aid and method which simplifies, insofar as possible, the basic concepts of and principles of operation involved in mathematics. Prior United States patents in this art of which I am aware include the following U.S. Pat. Nos. 1,826,034; 2,369,804; 2,866,278; and 3,129,518.

Each of the devices described in the foregoing patents suffers from one or more deficiencies. In my view, the proliferation of prior art attempts to devise a simplified visual teaching aid attests to the fact that there still exists a tremendous need to simplify and clarify such apparatuses and associated instructional techniques until everything possible has been done to meet the needs of the slow-learning child having limited abilities, such as a retarded child. While many prior art devices have attempted to expand or generalize an overall understanding of arithmetic, such expansion and generalization, I have found, often obscures the necessary and basic concepts involved in, for example, subtraction, to the slow-learning or retarded child. Given the fact that the communication of mathematical concepts is most difficult with a slow-learning or retarded child, it follows that the greatest need exists for a device which can be utilized as a visual mathematical teaching aid when dealing with such disadvantaged children or slow-learning students.

Another deficiency inherent in the prior art devices is their limited ability to appeal only to a child's visual learning sense. While several prior art devices do appear to utilize manual manipulation of beads, logs, or the like, the mathematical values represented by such workpieces must be re-translated into numerical components to complete the learning process. The additional step of translating representative workpieces into associated component values is, I have found, a substantial inhibiting factor in the learning processes involved with a retarded or otherwise slow-learning student. It is therefore understood that an apparatus and method which can, by and large, eliminate this intermediate step would be of great value.

The teaching aid device and technique advanced in my earlier patent application identified above goes a long way towards solving many of the above-stated problems with respect to prior art devices. More particularly, my invention described and claimed in the earlier application comprises a support member having a surface divided into a plurality of work areas arranged in a column and row form. There is provided one column corresponding to each place-value component, i.e., ones, tens, hundreds, thousands, ten thousands, etc. The work areas, which preferably comprise receptacles for workpieces, are arranged in increasing widths from right to left. A plurality of sets of workpieces are also provided, the number of sets corresponding to the number of columns of place-value components. The workpieces within each set have a three-dimensional physical configuration corresponding to one of the place-value components. The width of the workpieces of each set correspond to the width of its corresponding column such that each column may accommodate only those workpieces having the appropriate place value. At least two rows of work areas or compartments are defined for each column, one row having an area for accommodating no more than nine workpieces, the other row having an area for accommodating no more than ten workpieces. The latter row is extremely useful in the subtraction process for illustrating re-grouping of a higher order place-value component to its ten lower order components.

While the structure described in my earlier application is particularly useful in aiding the teaching process with respect to slow-learning students, I have found that the more intelligent young children, who need to be taught the same basic processes, are somewhat frustrated by the inherent slow speed with which that apparatus must be manually manipulated. In other words, while uniquely suited for slow-learners, I have found a need to automate somewhat the basic apparatus described in my earlier application in order to attract the quicker learning child of normal intelligence. It is towards this end that the instant application is advanced.

OBJECTS AND SUMMARY OF THE INVENTION

It is accordingly a primary object of the present invention to provide a mathematics visual aid which simplifies and clarifies to the utmost degree the learning processes involved in teaching mathematics to both slow-learning children and children of normal intelligence.

Another object of the present invention is to provide a mathematics visual teaching aid which is extremely simple and straightforward in operation.

An additional object of the present invention is to provide a mathematics teaching aid and technique for the use thereof which facilitates greatly the learning processes involved in teaching subtraction to both slow and quick learning children.

The foregoing and other objects are attained in accordance with one aspect of the present invention through the provision of a mathematics visual aid useful in teaching the importance of the place-value components 1, 10, 100, 1,000, etc., which comprises a support member having divider means formed thereon for defining a plurality of columns and first and second rows of work areas. A plurality of sets of workpieces are also provided and are adjustably mounted within the rows and columns of work areas. The number of different sets of workpieces corresponds to the number of columns of work areas and, hence, to the number of place-value components desired. The first and second rows of work areas are adjacently positioned such that each column includes aligned workpieces from the first and second rows. The first or upper row of each column preferably had nine workpieces adjustably positionable and mounted therein, while the second or lower row of each column preferably has ten workpieces adjustably positioned and mounted therein.

In accordance with other aspects of the present invention, each of the workpieces comprises an elongate substantially cylindrical body having a shaft extending longitudinally axially therethrough. Each workpiece has information-bearing indicia formed along one surface thereof. The information-bearing indicia of each set of workpieces comprises a unique place-value component formed in three dimensions and extending upwardly from the cylindrical surface thereof. Means extend through the shaft of each of the workpieces about which the workpieces are rotatable such that the user may selectively expose the information-bearing indicia of each workpiece while working out a mathematical problem. The rotatable means preferably takes the form of elongated pivot pins which extend through upwardly facing parallel side walls and intermediate divider members of the apparatus. The permanently mounted but rotatable nature of each of the workpieces allows the more intelligent quick-learning child to go through the manipulative steps involved in the teaching process with a greater speed than possible in prior art devices.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 2 is a cross-sectional view of the apparatus illustrated in FIG. 1 and taken along line 2—2 thereof;

FIG. 3 is a sectional view of the apparatus depicted in FIG. 1 and taken along line 3—3 thereof;

FIG. 4 is a perspective view of a preferred form of the "TENS" place-value component in accordance with the present invention;

FIG. 5 is a front view of the workpiece illustrated in FIG. 4; and

FIG. 6 is an end view of the workpiece illustrated in FIGS. 4 and 5.

DETAILED DESCRIPTION OF A PREFERRED EMBODIMENT

Figure 1:
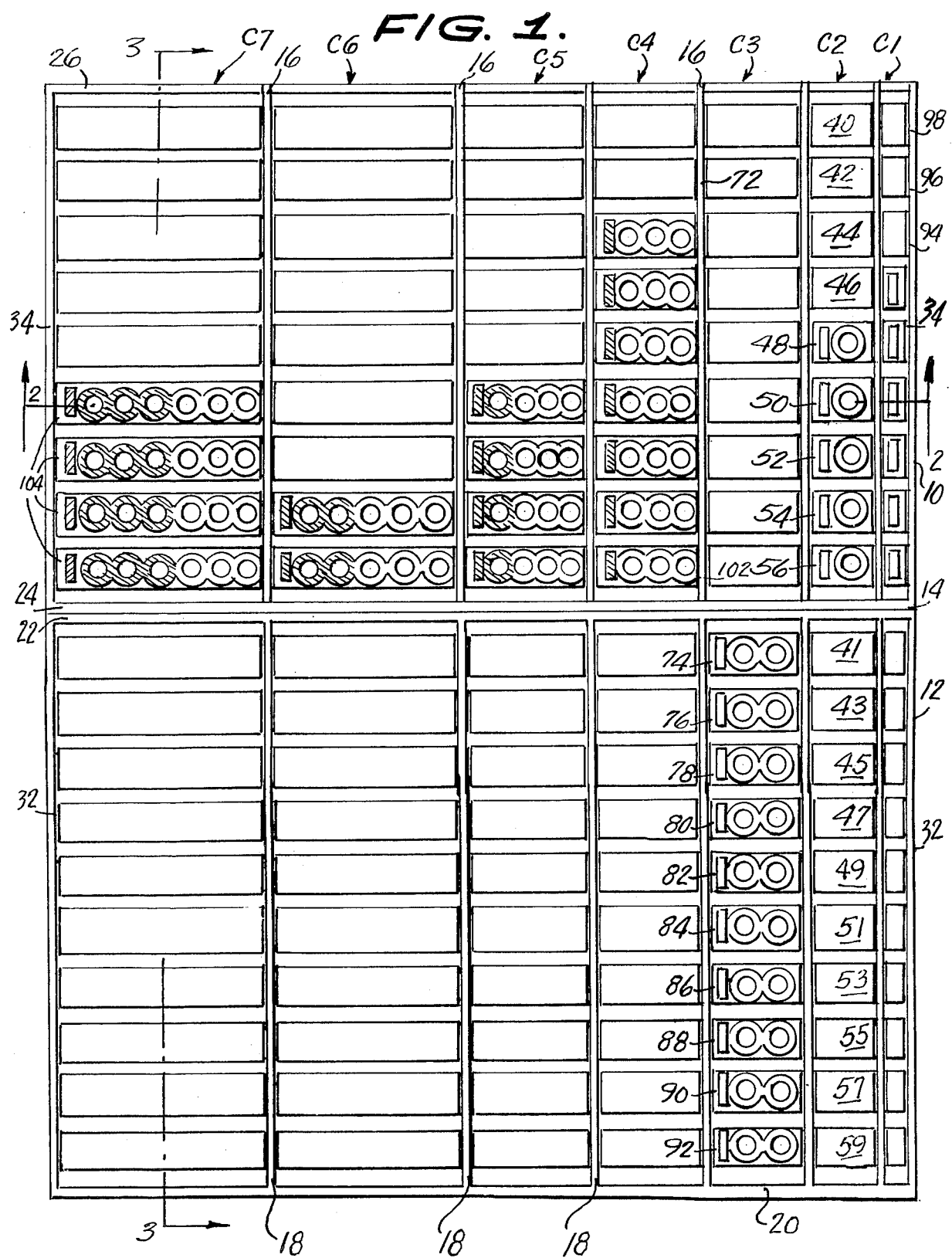
FIG. 1 is a plan view of a preferred embodiment of the mathematics teaching aid according to the present invention.

Referring now to the drawings, wherein like reference numerals represent identical or corresponding parts throughout the several views, and more particularly to FIGS. 1 through 3, there is illustrated in plan and sectional views the teaching aid apparatus in a preferred embodiment of the present invention.

The apparatus is seen to comprise a support member which includes a first horizontal row or upper section 10 and a second horizontal row or lower section 12. Upper section 10 includes a plurality of vertical dividers and support members 16, while lower section 12 has a plurality of similar vertical dividers and support members 18. Vertical dividers 16 are connected between horizontal support members 24 and 26 of upper section 10, while vertical dividers 18 are similarly connected between horizontal support members 20 and 22 of lower section 12.

As best seen in FIGS. 2 and 3, upper section 10 further includes a substantially planar back support member 30, while lower section 12 includes a similar substantially planar back support member or base 28. Extending upwardly from respective edges of base 30 are a pair of substantially parallel side walls 34. Extending upwardly from respective edges of back support member or base 28 of lower section 12 are a pair of substantially parallel outer vertical support members or side walls 32.

FIG. 2 clarifies the substantially perpendicular orientation of vertical divider members 16 to base member 30, the same relationship being maintained for vertical dividers 18 with respect to base member 28 of the lower section 12. The horizontal dividing walls and support members 22 and 24 are joined, as at 14, by a suitable adhesive. Alternatively, walls 22 and 24 could be integrated into a single structure, as could base members 28 and 30, depending upon the mode of manufacture desired.

Referring back to FIG. 1, it is seen that the vertical divider bars 16 and 18 of upper and lower sections 10 and 12 define in the embodiment illustrated fourteen individual compartments or work areas which are arranged in seven vertical columns designated by C1, C2, C3, C4, C5, C6 and C7 and two horizontal rows designated by reference numerals 10 and 12. The seven columns C1 through C7 correspond respectively to the seven place-value components 1, 10, 100, 1,000, 10,000, 100,000, and 1,000,000, utilized in this embodiment. It is to be understood that either a greater or fewer number of columns may be included, depending on the number of place-value components desired to be utilized.

Within each column C1 through C7 are adjustably positioned a total of nineteen workpieces, nine of which are mounted in the upper section or row 10, and ten of which are mounted in the lower section or row 12. For example, in the upper section or row 10 of column C2 are mounted nine "TENS" workpieces 40, 42, 44, 46, 48, 50, 52, 54 and 56, while in the lower section or row 12 of column C2 are mounted ten "TENS" workpieces 41, 43, 45, 47, 49, 51, 53, 55, 57, and 59. In the particular exemplary embodiment illustrated in FIG. 1, workpieces 40, 42, 44, 46, 41, 43, 45, 47, 49, 51, 53, 55, 57 and 59 are oriented in such a manner that their information-bearing indicia are not in view of the user, while workpieces 48, 50, 52, 54 and 56 are oriented in such a fashion that their information-bearing indicia are readily visible to the user.

Each of the workpieces are mounted in such a manner that the user may readily rotate same to selectively expose their information-bearing indicia. As is apparent, the information-bearing indicia in the set of workpieces in column C2 each correspond to the place-value "TEN".

Referring now to FIGS. 4 through 6, the construction of an exemplary TENS workpiece 58 is illustrated in more detail. Workpiece 58 is seen to comprise a substantially cylindrical body 60 which has a centrally formed shaft 62 extending axially therethrough. Cylindrical body 60 terminates in a pair of substantially parallel planar end walls 66. Extending upwardly from the cylindrical surface 60 of workpiece 58 is the numeral 1 68 and the numeral 0 64 which are molded in an adjacent relationship so as to form the place-value component 10.

Workpiece 58 is preferably formed by molding techniques and may comprise plastic, papier-mache, or any other suitable substance. In the preferred embodiment illustrated, numeral 64, for example, is formed with an aperture 70 extending through to shaft 62, although this is a design feature which is obviously not critical to the successful operation of the present invention.

FIG. 6 illustrates in solid outline one position of the workpiece 58 where the information-bearing indicia face upwardly, and in dotted outline illustrates the orientation of the information-bearing indicia when the workpiece 58 has been rotated about its axial shaft 62 such that the information-bearing indicia would be out of view to a user looking down from the top.

As best illustrated in FIG. 2, the workpieces 58 are preferably rotatably maintained in position with the support member by means of an elongate pivot pin 36 that extends through shafts 62 and aligned apertures formed in intermediate vertical divider members 16. Pivot pin 36 is secured to the outer side walls 34 of the support structure. Other adjustable and rotatable mounting techniques for the individual workpieces 58 will suggest themselves. In the embodiment illustrated, a plurality of pivot pins 36 are provided (FIG. 3), one for each of the nineteen individual horizontal rows of workpieces. It should be noted that the respective diameters of shafts 62 and pivot pins 36 should be sized so as to enable the workpiece to rotate about the pin and yet be maintainable in a selected orientation once manual pressure is removed. The foregoing will generally require a somewhat close friction fit for proper operation.

The principles of operation of the instant apparatus are similar to those described in my aforesaid co-pending application, which is expressly incorporated herein by reference. In my earlier application, complete examples of the utilization of the apparatus therein described was provided, and reference thereto would be helpful in understanding the similar principles of operation of the instant apparatus. By way of a brief example, reference is made to FIG. 1 which illustrates a step intermediate the solution of the following subtraction problem:

$$\begin{array}{r} 4,248,069 \\ -4,246,413 \\ \hline \end{array}$$

FIG. 1 illustrates the orientation of the various place-value components in an intermediate step during the solution of the above-stated problem. Initially, the student sets up the problem by exposing the information-bearing indicia of the correct number of workpieces for each place-value component in the minuend. For example, in column C7 of upper section 10, four "ONE MILLIONS" workpieces 104 are exposed, the remaining workpieces in column C7 having their information-bearing indicia oriented out of sight in the reverse direction.

In initially setting up the above-stated problem, all nine workpieces in upper section 10 of row C1 were exposed. In performing the first step of the subtraction problem (9−3), however, the student manually manipulated the three workpieces 94, 96, and 98, which three workpieces represented the subtrahend of the "ONES" place-value component, to visually remove them from view. It is seen that the resulting number of workpieces in upper section 10 of column C1 is six, which represents the correct answer for the "ONES" place-value component of the above-stated problem.

Column C2 of the workpieces in FIG. 1 also illustrates the orientation of the "TENS" workpieces after the student has performed the subtraction associated with that particular place-value component. Initially, six workpieces in upper section 10 of column C2 had their information-bearing indicia exposed, and the student simply rotated one of the workpieces, for example workpiece 46, to leave the five workpieces 48 through 56 exposed, which represents the correct answer (5) for the "TENS" place-value component of the above-stated problem.

Moving along to the "ONE HUNDREDS" place-value component in column C3, the student normally faces a paradox. That is, he is asked, by virtue of the above-stated problem, to subtract four "ONE HUNDREDS" when there do not appear any "ONE HUNDREDS" exposed. Thus, the student must be taught to "borrow" a "ONE THOUSAND" place-value component from column C4 and re-group same into ten "ONE HUNDREDS" in column C3. This intermediate step is illustrated in FIG. 1 wherein a "ONE THOUSAND" workpiece 72 has just been rotated out of sight to be re-grouped into ten lower order "ONE HUNDREDS" workpieces 74, 76, 78, 80, 82, 84, 86, 88, 90, and 92 which have just been selectively exposed in the lower section 12 of column C3.

By virtue of the aforedescribed re-grouping, the student now has ten "ONE HUNDREDS" 74-92 from which to subtract the required four "ONE HUNDREDS" which may be simply achieved by rotating, for example, the workpieces 74, 76, 78 and 80. The foregoing step will leave exposed six "ONE HUNDRED" workpieces 82, 84, 86, 88, 90 and 92 which is the correct number for this place-value component of the problem.

The student will then proceed to rotate six of the remaining seven "ONE THOUSANDS" workpieces in column C4 of upper section 10 to leave exposed only the information-bearing indicia of workpiece 102. The remaining exposed workpieces in columns C5, C6, and C7 will also be rotated out of view. Thus, the final solution to the problem will be reflected in the apparatus of the present invention by virtue of no workpieces being upturned in columns C7, C6 or C5, one workpiece 102 being upturned in column C4, six workpieces being upturned in column C3, five workpieces being upturned in column C2, and finally six workpieces being upturned in column C1, thereby visually and accurately reflecting the proper answer (1656).

Although the primary utilization of the device of the present invention is believed to be in connection with the teaching of the processes associated with subtraction, it will be apparent both from the above description and from my aforesaid co-pending application that the device may be equally utilized to illustrate concepts associated with addition. A person of ordinary skill in this art will realize that multiplication and division, simple extensions of basic addition and subtraction, may also be taught by utilizing the device of the present invention.

It is apparent that numerous modifications of the present invention are possible in light of the above teachings. It is therefore to be understood that within the scope of the appended claims, the invention may be practiced otherwise than as specifically described herein.

I claim as my invention:

1. A mathematics visual aid useful in teaching the importance of the place-value components 1, 10, 100, ... $10^n$ ($n=0, 1, 2 ...$), which comprises:
   a support member;
   divider means formed on said support member for defining a plurality of columns of work areas and first and second rows of work areas; and
   a plurality of sets of workpieces, the number of said sets corresponding to the number of said columns of work areas, a unique set of workpieces rotatably mounted within each of said columns, all the workpieces within each of said sets sharing a common physical configuration which differs from the common physical configuration shared by the workpieces in each of the other sets.

2. The apparatus as set forth in claim 1, wherein each of said workpieces comprises an elongate body having a shaft extending longitudinally therethrough and having information-bearing indicia formed on one surface thereof.

3. The apparatus as set forth in claim 2, further comprising means extending through said shaft of each of said workpieces about which said workpieces are rotatable so as to selectively expose said information-bearing indicia of each of said workpieces.

4. The apparatus as set forth in claim 3, wherein said support member comprises a substantially planar base and a pair of substantially parallel side walls extending upwardly from respective edges of said base.

5. The apparatus as set forth in claim 4, wherein said means extending through said shaft of each of said workpieces comprise a plurality of elongated pivot pins extending between and secured to said parallel side walls of said support member.

6. The apparatus as set forth in claim 5, wherein said divider means comprises a plurality of substantially parallel divider members extending upwardly from said base of said support member and positioned substantially parallel to said side walls.

7. The apparatus as set forth in claim 6, wherein each of said divider members has a plurality of apertures formed therein through which said pivot pins are positioned.

8. The apparatus as set forth in claim 7, wherein the number of workpieces located in each of said columns of said first row is nine, and wherein the number of workpieces located in each of said columns of said second row is ten.

9. The apparatus as set forth in claim 8 wherein the rightmost column of work areas contains the set of workpieces whose information-bearing indicia comprises the 1 place-value component, the next adjacent column contains the set of workpieces whose information-bearing indicia comprises the 10 place-value component, and so on, such that each of said plurality of columns has a unique set of workpieces, and hence place-value components, associated therewith.

10. The apparatus as set forth in claim 9, wherein said first row of work areas is positioned adjacent said second row of work areas such that each column of work areas includes a work area in said first row and a work area in said second row.

11. The apparatus as set forth in claim 3, wherein said elongate body comprises a cylindrical surface and planar parallel end walls, said information-bearing indicia extending in a linear fashion on a portion of said cylindrical surface.

12. The apparatus as set forth in claim 11, wherein said information-bearing indicia of each set of workpieces comprises a unique place-value component formed in three-dimensions and extending upwardly from said portion of said cylindrical surface.

13. The apparatus as set forth in claim 6, further comprising horizontal divider means for separating said first row areas from said second row of work areas.

14. The apparatus as set forth in claim 1 wherein each of said workpieces has indicia formed on a surface thereof and wherein said rotatable mounting of said workpieces within said columns permit said indicia to be selectively exposed.

* * * * *